United States Patent Office 2,868,697
Patented Jan. 13, 1959

2,868,697

FOAM CONTROL IN THE DISTILLATION OF CYCLOPENTADIENYL MANGANESE TRICARBONYL

J. Byron Bingeman and Arthur F. Limper, Baton Rouge, La., assignors to Ethyl Corporation, New York, N. Y., a corporation of Delaware No Drawing. Application March 14, 1958
Serial No. 721,365

1 Claim. (Cl. 202—40)

This invention relates to the manufacture of organo manganese compounds and more particularly, to a process for the separation and recovery of cyclopentadienyl manganese tricarbonyl compounds.

Cyclopentadienyl manganese tricarbonyl compounds have been found to be exceptionally effective antiknocks for gasoline used in internal combustion engines as taught in U. S. Patent No. 2,818,417. One preferred method of manufacture of these compounds involves a three-step process: (1) reaction of sodium metal with a cyclopentadiene hydrocarbon; (2) reaction of manganous chloride with the cyclopentadienyl sodium compound formed in step 1; and (3) reaction of the bis(cyclopentadienyl) manganese compound formed in step 2 with carbon monoxide. All of the above steps are conducted in an ether solvent. The crude reaction product contains both polymeric and inorganic salt impurities, usually constituting about 50 percent of the total product. The volatile product, including the ether solvent, is normally separated from these non-volatile impurities by distillation, either vacuum or steam and, thereafter, the ether solvent and unreacted cyclopentadiene hydrocarbon is fractionally distilled from the higher boiling cyclopentadienyl manganese tricarbonyl product. Most frequently, in the latter separation the major quantities of ether and hydrocarbon are initially distilled, leaving a concentrated product containing only minor quantities of ether and/or cyclopentadiene hydrocarbon, and this concentrated product is then redistilled to remove the remaining ether or hydrocarbon from the product. However, it is found that this second distillation is extremely difficult to control in large scale operations due to the tendency of the mixture to foam. Thus, purification of the product has been extremely difficult, even with very low feed rates and even with fractionation equipment having a very large number of theoretical plates.

It is accordingly an object of this invention to provide an improved process for the separation and recovery of cyclopentadienyl manganese tricarbonyl compounds. Another object is to provide a process wherein the cyclopentadienyl manganese tricarbonyl compounds can be efficiently and economically separated by distillation from ether solvents and/or cyclopentadiene hydrocarbon without undue foaming in the distillation equipment. Other objects of this invention will become more apparent in the following description and appended claim.

These and other objects of the present invention are accomplished by distilling the mixture under conditions whereby the overhead stream comprises a mixture of cyclopentadiene hydrocarbon and the cyclopentadienyl manganese tricarbonyl, said cyclopentadienyl manganese tricarbonyl being present in from about 20 to about 90 weight percent of the overhead stream, the bottoms stream containing the major portion of the cyclopentadienyl manganese tricarbonyl and being essentially free of cyclopentadiene hydrocarbon. This technique eliminates or materially reduces any tendency of the system to foam.

Thus, it is found that the cyclopentadienyl manganese tricarbonyl product actually acts as a defoaming agent in the vapor state and permits high rates of distillation and separation of a highly pure product.

The quantity of cyclopentadienyl manganese tricarbonyl product removed in the overhead depends somewhat on the actual distillation conditions and the particular ether or hydrocarbon impurity. However, it principally depends on the quantity of air which contaminates the system. In general, the distillation is conducted whereby the overhead stream contains from about 20 to about 90 weight percent of the cyclopentadienyl manganese tricarbonyl product. A more preferred concentration is between about 35 to 70 weight percent of cyclopentadienyl manganese tricarbonyl product in the overhead. When any appreciable quantity of air contaminates the feed, the higher concentrations are preferred since air materially increases the tendency of the mixture to foam during distillation.

More specifically, the process of this invention comprises subjecting an impure mixture or solution of a cyclopentadienyl manganese tricarbonyl containing minor quantities of the corresponding cyclopentadienyl hydrocarbon and/or an ether boiling below the boiling point of the cyclopentadienyl manganese tricarbonyl to a first distillation whereby the major quantities, i. e. above about 90 percent of the ether and hydrocarbon are vaporized and removed from the impure mixture, leaving a concentrated stream containing the cyclopentadienyl manganese tricarbonyl and only minor quantities (usually less than 5 percent) of the ether and/or hydrocarbon, subjecting the concentrated stream to a second distillation to form a second vapor stream containing the remaining residual minor quantities of the ether and hydrocarbon and a portion of the cyclopentadienyl manganese tricarbonyl product and recycling the second vapor stream to the first distillation for treatment along with fresh impure mixture, the recycled stream containing at least 20 weight percent of the cyclopentadienyl manganese tricarbonyl, based upon the total weight of overhead, i. e. ether, hydrocarbon, and cyclopentadienyl manganese tricarbonyl. In general, the overhead should contain from about 20 to about 90 weight percent and preferably from about 35 to 70 weight percent of the cyclopentadienyl manganese tricarbonyl in order to prevent undue foaming during distillation of fractionation.

The concentrated feed to the second column will normally contain small quantities, i. e. from 1 to 10 percent of the cyclopentadiene hydrocarbon, from 0 to 10 percent of ether when the solvent boils below the boiling point of the cyclopentadienyl manganese tricarbonyl product (10–70 percent when a higher boiling solvent is used) and, when employed, from 5 to 25 percent of a high boiling aromatic hydrocarbon used as a suspending agent for separation of the non-volatile components from the crude reaction mixture.

The specific temperature, pressure and other conditions employed in the distillations referred to above will depend largely upon the particular cyclopentadienyl manganese tricarbonyl compound being purified and the particular hydrocarbon and ether solvent employed. In general, the first distillation can be conducted with a bottoms temperature at or near the boiling point of the hydrocarbon or ether at distillation pressure whereas, the second distillation is best conducted at the boiling temperature of the cyclopentadienyl manganese tricarbonyl. The distillation pressures can be below or above atmospheric, e. g., 0.1 to 100 atmospheres. However, the first distillation is preferably conducted at atmospheric pressure or above so as to provide a distillation temperature above about 160° to 200° C. in order to decompose the cyclopentadiene dimer to monomer. The second distillation is preferably conducted at reduced pressures, usually 2 to 100 millimeters of mercury, to lower the distillation temperature.

The impure cyclopentadienyl manganese tricarbonyl compound can be made by a wide variety of methods. However, a particularly suitable process comprises the reaction of sodium and a cyclopentadiene hydrocarbon compound in an ether solvent at a temperature of from about 0 to 250° C. to form the corresponding sodium cyclopentadienyl compound, thereafter adding to this reaction product a manganous salt, such as the chloride to form the bis(cyclopentadienyl) manganese compound. This reaction is normally carried out at a temperature of about 50 to 250° C. Carbon monoxide is then added to this second reaction mixture to convert the bis(cyclopentadienyl) manganese compound to the corresponding cyclopentadienyl manganese tricarbonyl compound. The carbonylation reaction is best carried out at a temperature of from about 50 to 300° C., preferably 150° to 200° C. using carbon monoxide pressures of from atmospheric to about 10,000 pounds. The ether solvent and any unreacted cyclopentadiene are then separated from the reaction mixture by the process of this invention and preferably recycled to the sodium reaction. Any recycled material is preferably freed of the cyclopentadienyl manganese tricarbonyl product sufficiently to maintain the concentration of the cyclopentadienyl manganese tricarbonyl product in the sodium reaction mixture below about 0.1 weight percent, based upon the weight of sodium.

The crude reaction product from the carbonylation reaction is first freed of non-volatile components, i. e. inorganic salts and polymer by vacuum or steam distillation. During this distillation, it is best to maintain the non-volatile impurities in a fluid state such as by the addition of a high boiling aromatic hydrocarbon, such as naphthalene, alkylated naphthalenes, diphenyl, etc. for easy and efficient removal from the vacuum distillation still. The volatile components thereafter can be fractionated in accordance with this invention.

A particularly preferred method of separating the volatile components, i. e. cyclopentadiene manganese tricarbonyl compound, hydrocarbon and in some cases ether solvent, involves fractionation at a sufficient pressure, as mentioned above, to maintain the temperature above about 160° C. and preferably above about 200° C. to decompose (and distill) relatively unstable components, particularly cyclopentadiene dimer, which form low boiling by-products during the separation operation. A particularly useful technique involves the concurrent fractionation of both the solvent (when relatively low boiling) and cyclopentadiene compound fractions during this stabilization operation. Thus, a convenient means involves feeding the volatile, impure product into a fractionating column maintained at a bottoms temperature above about 160° C. and simultaneously removing the major quantities of cyclopentadiene compound and solvent overhead, while removing the cyclopentadienyl manganese tricarbonyl compound (and aromatic suspending agent if present) at the bottom of the column. The solvent, if desired, can be separately recovered as a side stream during fractionation. This high temperature fractionation technique has been found to give extremely pure solvent and cyclopentadiene compound which can be recycled either together or separately directly to the sodium reaction. If desired, the recovered cyclopentadiene can be first dimerized, i. e. before recycle, to prevent a too rapid reaction with sodium. This can be done using polymerization catalysts, e. g. peroxide or metal alkyls such as aluminum triethyl or preferably merely by heating, i. e. at temperatures above about 50° C. Pure cyclopentadienyl manganese tricarbonyl product can be obtained by a second fractionation wherein the overhead stream contains at least 20 weight percent product, as defined above, and this stream is then recycled to the first distillation i. e. the pressure distillation. The so-purified product thereafter can be further fractionated to separate any high boiling suspending agent which was volatilized in the initial separation of the volatiles from the non-volatile impurities.

The above process is particularly suitable for the separation of a wide variety of cyclopentadienyl manganese tricarbonyl compounds in which the cyclopentadienyl group contains a five carbon ring, such as found in cyclopentadiene itself. This cyclopentadienyl group can be substituted with one or more monovalent hydrocarbon radicals or can be of a condensed ring type, such as the indenyl or fluorenyl type. The process is particularly suitable for the manufacture of compounds in which the cyclopentadienyl group contains 5–13 carbon atoms. These compounds have a molecular weight of up to 315. Typical examples are: cyclopentadienyl manganese tricarbonyl, methylcyclopentadienyl manganese tricarbonyl, ethylcyclopentadienyl manganese tricarbonyl, butylcyclopentadienyl manganese tricarbonyl, hexylcyclopentadienyl manganese tricarbonyl, triethylcyclopentadienyl manganese tricarbonyl, methylindenyl manganese tricarbonyl and the like.

The following examples illustrate the novel features of the process of this invention. In these examples, the quantitative units are given in parts by weight.

EXAMPLE I

Methylcyclopentadiene dimer (containing from 1–5 percent cyclopentadiene) is gradually added to molten sodium metal (1526 parts) in diethylene glycol dimethyl ether (4313 parts) in a reactor, previously purged with dry nitrogen, provided with heating means and means to agitate the mixture. The total feed of methylcyclopentadiene over a 2-hour period is 5,870 parts. The reaction is continued for 1 hour at 185° C. and thereafter the temperature is raised to 190° C. for an additional hour to complete the reaction. The reaction mixture is stirred during the entire reaction. Hydrogen gas is evolved and recovered from the reactor. Thereafter, 4,278 parts of flaked, anhydrous manganous chloride (97 percent pure) is added to the reaction mixture and the reaction is maintained at a temperature of 165° C. until the reaction has ceased. The reaction mixture is also agitated during this reaction. The reaction mixture is then transferred to a pressure vessel provided with an agitator and to this reaction mixture is added carbon monoxide at a pressure of 650 p. s. i. g. The total carbon monoxide consumed in the reaction is 2,450 parts. The latter reaction is maintained at a temperature of 193° C.

The crude reaction mixture is then discharged to a vacuum distillation still and the volatile components removed by distillation at reduced pressure, terminating at about 50 millimeters of mercury. The overhead temperature at the end of this vacuum distillation is about 190° C. Prior to this distillation, 5,640 parts of a high boiling hydrocarbon mixture which is predominantly benzene and naphthalene, including alkyl derivatives, sold under the trade name Phillips Aromatic Petroleum Fraction, marketed by Phillips Petroleum Company, was added to the still. This aromatic mixture has an initial boiling point of between about 192° to 210° C. at atmospheric pressure. This material has an aromatic content of 75 percent, a gravity in degrees A. P. T. of 10.8 at 60° F. and a boiling range for the major fraction of between about 470° to 895° F. The vacuum distillation was continued until substantially no volatile materials were left in the residue. These volatile components were then subjected to fractionation in a 30 plate column at a bottoms temperature of about 200° to 230° C. and 4 p. s. i. g. pressure. The impure material was fed into the column on the fifteenth plate. The major quantities of solvent and methlcyclopentadiene (monomer) were removed overhead and recycled to the sodium reactor for a second cycle. The recycled monomer was dimerized prior to recycle by heating for several hours at 120° C. This results in a less vigorous reaction with sodium.

The concentrated stream containing 76.8 percent by weight methylcyclopentadienyl manganese tricarbonyl, 4.1 percent methylcyclopentadiene, 5.7 percent by weight diethylene glycol dimethyl ether and 13.4 percent of the aromatic hydrocarbon fraction is then fractionated at a bottoms temperature of 230° C. and 400 millimeters' Hg pressure, giving an overhead composition of 5.7 parts ether, 4.1 parts methylcyclopentadiene, and 9.9 parts methylcyclopentadienyl manganese tricarbonyl. This overhead stream is recycled to the first product fractionation (pressure fractionation) for retreatment with fresh volatile product obtained from the first separation step. The purified product stream (free of ether and cyclopentadiene hydrocarbon, is then fractionated at a bottoms temperature of 210° C. and 500 millimeters' Hg pressure to vaporize the methylcyclopentadienyl manganese tricarbonyl and separate the same from the small quantities of relatively high boiling aromatic hydrocarbons.

The purified methylcyclopentadienyl manganese tricarbonyl compound when mixed with gasoline increases appreciably the octane rating of the gasoline. The following table illustrates the effectiveness of methylcyclopentadienyl manganese tricarbonyl, using a commercial gasoline having an initial boiling point of 94° F. and a final boiling point of 390° F. The anti-knock value of the fuel determined by the ratings are given in octane numbers for figures below 100 and in Army-Navy performance numbers for values above 100. The method of determining performance numbers is explained in the booklet, "Aviation Fuels and Their Effect Upon Engine Performance," NAVAER–06–5–501, USAF T. O. No. 06-5-54, published in 1951.

Table I

COMMERCIAL GASOLINE HAVING AN I. B. P. OF 94° F. AND AN F. B. P. OF 390° F.

| $C_6H_7Mn(CO)_3$, g. metal/gal. | Octane Rating |
|---|---|
| 0 | 83.1 |
| 1.0 | 92.7 |
| 2.0 | 95.8 |
| 3.0 | 98.0 |
| 5.0 | 102.0 |

EXAMPLE II

Example I is repeated except that the second fractionation column is operated under conditions whereby only about 30 percent of the overhead is methylcyclopentadienyl manganese tricarbonyl. Under these conditions, very little or no foaming takes place in the column if air is rigidly accrued from the column. The stream concentrations in parts by weight are given in Table II.

Table II

| Component | Conc. Feed | Overhead (Recycle) | Bottoms |
|---|---|---|---|
| Ethylene glycol dimethyl ether | 6.0 | 6.0 | |
| Methylcyclopentadiene | 4.0 | 4.0 | |
| Methylcyclopentadienyl manganese tricarbonyl | 75.4 | 4.8 | 70.6 |
| Aromatic hydrocarbon | 14.2 | | 14.2 |

EXAMPLE III

Example I is repeated except that the second fractionation column is operated to provide an overhead stream which is recycled to the first column which contains about 70 percent of methylcyclopentadienyl manganese tricarbonyl. The operation of this column is very stable even though small quantities of air may be present in the column. The stream concentrations in parts by weight are given below in Table III.

Table III

| Component | Conc. Feed | Overhead (Recycle) | Bottoms |
|---|---|---|---|
| Ethylene glycol dimethyl ether | 5.1 | 5.1 | |
| Methylcyclopentadiene | 3.7 | 3.7 | |
| Methylcyclopentadienyl manganese tricarbonyl | 79.3 | 20.3 | 59.0 |
| Aromatic hydrocarbon | 11.9 | | 11.7 |

EXAMPLE IV

Example I is repeated except that cyclopentadienyl manganese tricarbonyl is formed from cyclopentadiene hydrocarbon, potassium metal and manganous acetate. These reactions are conducted in diethylene glycol dibutyl ether solvent. The crude mixture obtained from the carbonylation reaction is steam distilled in the presence of small quantities of disodium phosphate. The steam distillate is separated by cooling and allowing the fractions to separate. The water immiscible phase is then fed to a first distillation column wherein the excess cyclopentadiene dimer is depolymerized to the monomer and removed overhead from the column. This monomer is recycled to the reaction with potassium metal and reused in the process. The bottoms from the first column containing the cyclopentadienyl manganese tricarbonyl, diethylene glycol dibutyl ether in residual quantities of cyclopentadienyl dimer are fed to a second column wherein the remaining quantities of dimer cyclopentadiene are removed overhead along with about 50 percent (based on the total overhead stream) of cyclopentadienyl manganese tricarbonyl. This overhead stream is recycled to the first column. The bottoms from the second column containing cyclopentadienyl manganese tricarbonyl and diethylene glycol dibutyl ether are then fractionated in a third column to separate the cyclopentadienyl manganese tricarbonyl product as an overhead stream. The diethylene glycol dibutyl ether can then be recycled to the sodium reaction for reuse as the solvent.

EXAMPLE V

Example I is repeated except that indenyl manganese tricarbonyl is formed from the indenyl Grignard in diethyl ether solvent. The process and recovery conditions are the same as in Example I except that the reactions are conducted under pressure to prevent vaporization of the solvent and the sodium reaction is carried out using monomer feed.

EXAMPLE VI

Fluorenyl manganese tricarbonyl is produced in accordance with the procedure of Example I except that fluorene is fed to the sodium reaction and the chemical reactions are conducted in tetrahydrofuran solvent. Also, the sodium reaction is conducted at about 100° C. using fluorene monomer. The carbonylation reaction is conducted at 165° C. using 800 pounds carbon monoxide pressure.

When the above examples are repeated to produce butyl cyclopentadienyl manganese tricarbonyl starting with butyl cyclopentadiene; phenyl cyclopentadienyl manganese tricarbonyl starting with phenyl cyclopentadiene; or when other solvents are employed such as ethylene glycol dibutyl ether, triethylene glycol dibutyl ether, triethylene glycol dimethyl ether and the like, similar results are obtained.

The reaction of sodium and cyclopentadiene or its derivatives can be conducted in ether solvents at widely varying temperature conditions, generally from about −50° to 300° C. The preferred temperature depends both upon the specific solvent employed and upon the cyclopentadiene hydrocarbon which is reacted with sodium. Some of the cyclopentadiene compounds are difficult to maintain in monomeric form and thus they are more convenient to use in dimeric or low polymeric form. With these compounds, temperatures in the range of 150° to 250° C. are preferred, especially between 180° and 195° C. When monomeric cyclopentadiene compounds are used, temperatures in the range of 100°–150° C. give best results. Above 100° C. the sodium is in liquid form and thus the system can be merely agitated mildly to maintain a homogeneous mixture of the sodium and the reaction medium.

Many of the most useful cyclopentadiene hydrocarbons have a relatively low boiling point, at least in their monomeric form. With these hydrocarbons, the feed to the sodium reaction is maintained essentially equivalent to their rate of reaction to prevent vaporization and loss with the evolved hydrogen. It is found, however, that under the conditions of the present invention, excellent reaction rates and yields can be obtained even with the low boiling cyclopentadiene compounds without appreciable loss with the generated hydrogen. The maintenance of a reflux system in the sodium reaction can be used to increase the efficiency of hydrocarbon utilization at the more elevated temperatures.

Typical examples of ethers suitable for the process of this invention are dimethyl ether, methyl ethyl ether, methyl isopropyl ether, n-isopropyl ether or a mixture of these ethers. Polyethers are also suitable in the present invention and include ethylene glycol diethers and polyethylene glycol diethers, the diethylene glycol ethers being preferred. Typical examples are ethylene glycol dimethyl ether, ethylene glycol methyl ethyl ether, ethylene glycol ethyl ethyl ether, ethylene glycol methyl butyl ether, ethylene glycol butyl lauryl ether and the like. Typical examples of the preferred diethylene glycol diethyl ethers are the dimethyl, ethyl methyl, diethyl, ethyl butyl, dibutyl, and butyl lauryl ethers. Best results are obtained with alkyl groups of from 1 to 6 carbon atoms.

Other suitable ethers are triethylene glycol ethers such as dimethyl, diethyl, methyl methyl, etc., glycerol ethers such as trimethyl, dimethyl ethyl, diethyl methyl, etc., and cyclic ethers such as dioxane, tetrahydrofuran, methyl glycerol formal and dimethylene pentaderythrite.

The quantity of solvent which can be employed in the sodium reaction, and in the subsequent reactions can vary from about 0.2 part to about 10 parts or more per part of bis(cyclopentadienyl) manganese compound which is formed in the second step of the reaction. The more concentrated recipes are more usually preferred such for example as from about 0.5 to 1.2 moles per mole of reactants. Surprisingly, the more concentrated recipes appear to increase the reaction rate, particularly in the carbonylation step, and yet give highly fluid reaction media throughout the process. There are many economics involved in the use of a minimum quantity of solvent, particularly in increasing throughput of a unit reaction volume and decreased cost in the separation and recovery of the solvent.

The sodium cyclopentadienyl compound, preferably the reaction product of the first reaction, is then reacted with a manganous salt, either inorganic or organic. Best results are obtained with the manganous halides and particularly the chloride. However, very good results are also obtained with organic salts such as manganous acetate and propionate. Many of the manganous salts are hydroscopic and best results are obtained if the salt is maintained in an anhydrous form. Typical examples of suitable manganous salts are manganous chloride, bromide, iodide, fluoride, nitrate, sulphate, sulphide and various oxides such as MnO, $Mn_2O_3$ and the like. The quantity of manganous salt employed for reaction with the sodium cyclopentadienyl compound is important. Molar quantities of from 0.3 to about 1.5 of manganous salt to sodium cyclopentadienyl compound can be used, although it is best to use a slight excess of manganous salt. Thus from about 1.05 to 1.5 moles of manganous salt should be used per 2 moles of cyclopentadienyl sodium compound. With lower concentrations of manganous salt, the reaction medium tends to gel, making agitation and heat transfer difficult.

Higher concentrations of manganous salt can be used when a reducing agent is employed in the carbonylation step, such as a group I–III metal, metal hydride or organo metal compound containing a metal to carbon bond. Under these conditions, an equal molar quantity of cyclopentadienyl sodium and manganous salt is employed.

The temperature of the manganous salt reaction can be from about 50°–250° C. A more preferred temperature range is from between 100° and 200° C. The pressure of the reaction can be atmospheric or subatmospheric. Superatmospheric pressures can also be used and is desirable when a low boiling solvent is employed, i. e. solvents which boil below reaction temperatures.

The carbonylation reaction can be conducted either with gaseous carbon monoxide or with a compound which liberates carbon monoxide, such as a metal carbonyl. When gaseous carbon monoxide is employed, it is best to operate under pressure although pressures of from about atmospheric to about 10,000 p. s. i. g. can be used. Excellent reaction rates are obtained with pressures of 200 to 1000 p. s. i. g. carbon monoxide pressure.

Compounds which liberate carbon monoxide useful in this connection are any of the metal carbonyls. The desirable metal carbonyls are carbonyls of those metals having an atomic number of 23–79 of groups IB, VB, VIB and VIII of the periodic table. The group VIII metal carbonyls are particularly desirable for this purpose, especially iron pentacarbonyl.

Use of the above metal carbonyls as a source of carbon monoxide is particularly desirable since cyclopentadienyl metal by-products are formed, e. g. ferrocene is formed when using iron pentacarbonyl. These cyclopentadienyl metal by-products can thereafter be decomposed to regenerate the cyclopentadiene and metal. The cyclopentadiene can then be recycled to the process and the metal treated with additional carbon monoxide, preferably inexpensive dilute carbon monoxide, to regenerate the metal carbonyl. The regenerated metal carbonyl can also be reused in the process. A suitable technique for decomposition of cyclopentadienyl metal compounds, such as ferrocene is given in the J. of Am. Chem. Soc., vol. 79, p. 2746 et seq.

The temperature of the carbonylation reaction, as pointed out above, can be conducted at temperatures of from about 50° to 300° C., although the most preferred temperature range is from about 150° to 150° C. Very excellent reaction rates are obtained at temperatures of 190° to 250° C.

We claim:

In a process for the separation and recovery of a cyclopentadienyl manganese tricarbonyl compound from mixtures containing said cyclopentadienyl manganese tricarbonyl compound and cyclopentadienyl hydrocarbon comprising distilling said mixture under conditions whereby the overhead stream comprises a mixture of cyclopentadiene hydrocarbon and said cyclopentadienyl manganese tricarbonyl, said cyclopentadienyl manganese tricarbonyl being present in from about 20 to about 90 weight percent of said overhead stream, the bottoms stream containing the major portion of said cyclopentadienyl manganese tricarbonyl and being essentially free of cyclopentadiene hydrocarbon.

No references cited.

UNITED STATES PATENT OFFICE

CERTIFICATE OF CORRECTION

Patent No. 2,868,697                                                January 13, 1959

J. Byron Bingeman et al.

It is hereby certified that error appears in the printed specification of the above numbered patent requiring correction and that the said Letters Patent should read as corrected below.

Column 8, line 53, for "150° to 150° C." read -- 150° to 250° C. --.

Signed and sealed this 2nd day of June 1959.

(SEAL)
Attest:

KARL H. AXLINE                                                   ROBERT C. WATSON
Attesting Officer                                           Commissioner of Patents